Jan. 1, 1957  R. C. LUNDQUIST  2,776,018
SPEED REDUCTION DRIVE AND CHAIN TENSIONING DEVICE
Filed Nov. 19, 1951  3 Sheets-Sheet 1

Inventor:
RICHARD C. LUNDQUIST
By: Murray A. Gleeson
Attorney.

Jan. 1, 1957 R. C. LUNDQUIST 2,776,018
SPEED REDUCTION DRIVE AND CHAIN TENSIONING DEVICE
Filed Nov. 19, 1951 3 Sheets-Sheet 3
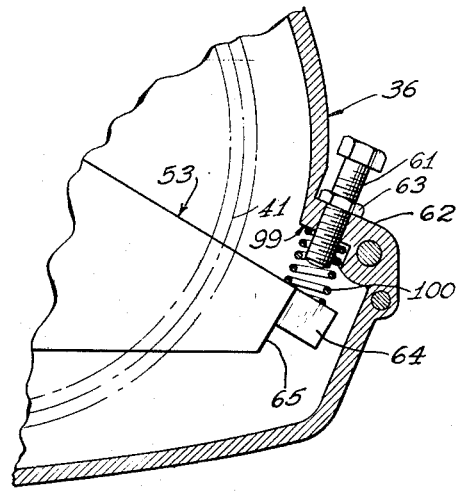
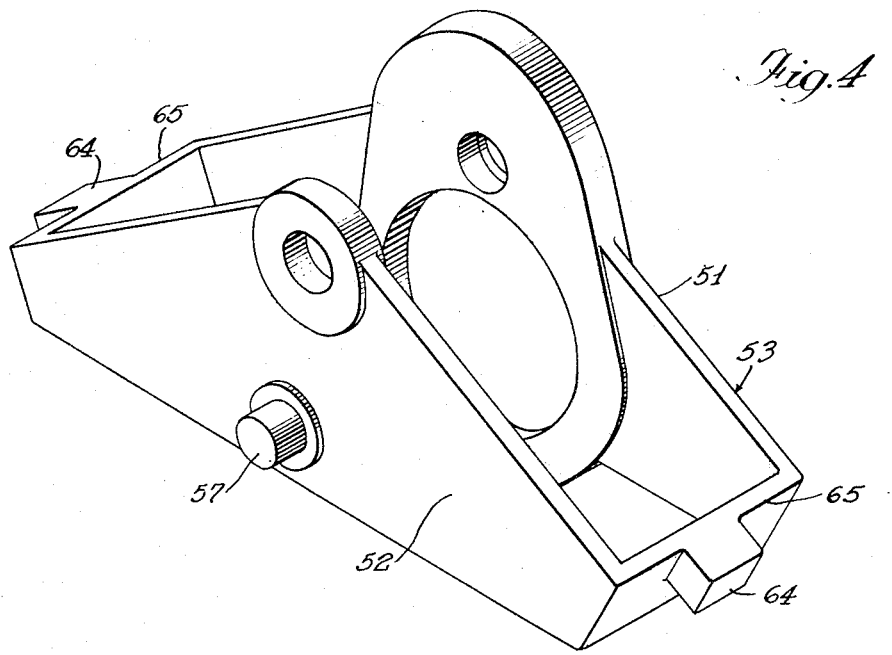
Inventor:
RICHARD C. LUNDQUIST
By: Murray A. Gleeson
Attorney

United States Patent Office 2,776,018
Patented Jan. 1, 1957

2,776,018

SPEED REDUCTION DRIVE AND CHAIN TENSIONING DEVICE

Richard C. Lundquist, Chicago, Ill., assignor to Goodman Manufacturing Company, Chicago, Ill., a corporation of Illinois Application November 19, 1951, Serial No. 257,169

3 Claims. (Cl. 180—9.1)

This invention relates to improvements in reduction drives and takeups therefor and has as its principal object to provide a simple, efficient and compact drive particularly adapted for loading machines used in confined places, such as mines.

It has heretofore been common practice to drive the continuous tread traction devices of loading machines through chain and sprocket drives driven by independent motors for each tread. In such drives, however, it has not been possible to provide the required reduction and still provide sufficient clearance between the casing for the reduction drive and the ground, so the machine may readily be manipulated, especially where the ground may be rough or uneven, or may be soft. As a result, the bottom must be clean, hard and regular, or the casings for the drives will hang up on the bottom.

One of the objects of my invention is to overcome these difficulties by providing a novel and efficient form of reduction drive for the continuous tread devices of a loading machine wherein the required reduction for efficient operation at the proper speeds is obtained, and a greater clearance between the ground and the gear casing for the reduction gearing is attained than in former reduction drives for like purposes.

Another object of my invention is to provide a compact chain and sprocket drive for driving a continuous tread device of a machine operable in confined spaces, wherein increased clearance between the sprocket and the drive is attained by recessing the shaft driven from the sprocket, within the limits of the sprocket.

Another object of my invention is to provide such a chain and sprocket drive in which the size of the driven sprocket, which is located adjacent the continuous tread and transmits drive thereto, is substantially enlarged over conventional arrangements to thereby lower the required working tension in the chain, but without decreasing the highly desired ground clearance beneath the drive casing. By thus decreasing the working tension in the chain, it is capable of withstanding greater operating shocks as for instance when suddenly reversing the crawler drive, particularly when operating on grades.

Another object is the provision of a chain and sprocket drive having means for adjusting the chain tension by rocking one of the chain-supporting sprockets about an eccentric axis to vary the distance between the sprockets. By this arrangement, both the taut and slack sides of the chain may be maintained in a straight line, regardless of the driving direction, and the relatively inefficient tightening rollers conventionally pressed into one or both sides of the chain are eliminated.

Another object of my invention is to provide a novel and improved form of chain and sprocket drive, operable in confined spaces which under certain load conditions may function satisfactorily, as automatic slack take-up means minimizing the slack in the chain over a long period of time and regardless of wear without attention from the operator.

Still another object of my invention is to provide a novel and improved form of slack adjusting means for a chain and sprocket drive, by mounting the sprocket for pivotable adjusting movement about the axis of the driven load-bearing shaft and minimizing slack in the chain by adjusting screws which regulate the pivotal position of the sprocket.

Still another object of my invention is to provide a novel and improved form of chain and sprocket drive, automatically maintaining tension on the drive chain by the reaction of the sprocket against a driven load bearing shaft disposed within the limits of the sprockets and at the same time providing novel resilient means for absorbing shock applied to the chain.

A further and more detailed object of my invention is to provide a slack take-up device for a chain and sprocket drive including a cage mounted for adjusting movement about the axis of the shaft driven from the sprocket, and forming a bearing support for the sprocket and movable to take up slack on the chain by tilting movement of the cage.

These and other objects of my invention will appear from time to time as the following specification proceeds and with reference to the accompanying drawings wherein:

Figure 4 is an isomeric view of the reaction cage forming the floating bearing support for the sprocket; and Figure 5 is a fragmentary view showing the cage held resiliently from rocking movement in a chain tightening direction.

As shown on the drawings:

Figure 1:
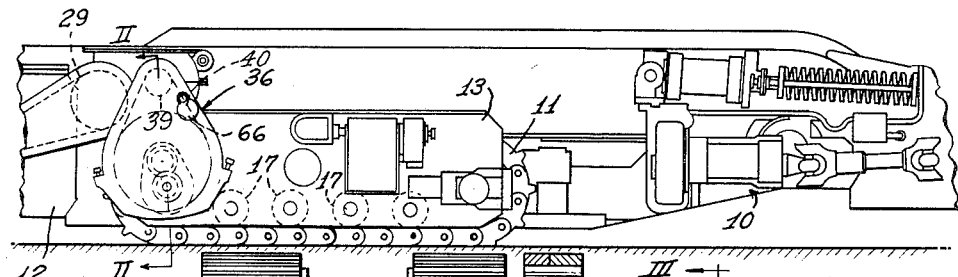
Figure 1 is a fragmentary view in side elevation of a face loading machine, illustrating a continuous tread device and drive therefor on one side of the machine.
Figure 2:
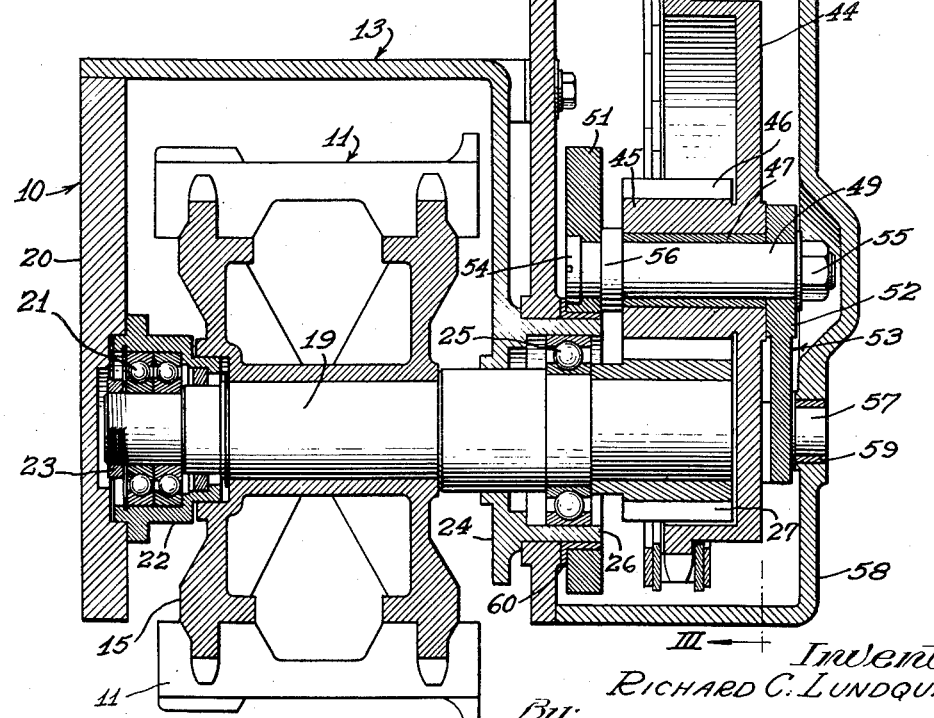
Figure 2 is an enlarged transverse sectional view taken substantially along line II—II of Figure 1.

In Figure 1 of the drawings I have shown a fragmentary view in side elevation of a face loading machine of the low vein type which is operable to load coal underground at the working face of a mine. The machine shown generally consists in a main frame 10 mounted on a pair of laterally spaced continuous tread devices 11—11 and having an inclined gathering and loading element (not shown) disposed in advance of said main frame and picking up and loading loose material onto a conveyor (not shown) extending over the top thereof rearwardly beyond the rear end of said main frame, for discharging the material gathered into mine cars or the like. Said loading machine is similar to that shown and described in Patent No. 2,388,385, which issued to Frank Cartlidge on November 6, 1945, so need only herein be shown and described in sufficient detail to make my present invention readily understandable.

An individual motor 12 is shown as being provided on each side of said main frame, for driving the continuous tread devices independently of each other, to propel the machine. The continuous tread devices 11, 11 are shown as being suitably mounted on opposite sides of the main frame 10 on tread frames 13, 13 secured thereto and extending outwardly therefrom. As herein shown the continuous tread devices mesh with and are driven from laterally spaced drive sprockets 15, 15, at the rear of the tread frames 13, 13 and turn about direction changing devices (not shown), which may be sprockets, at the forward end of said tread frames. A plurality of intermediate bogey wheels 17, 17 engage the lower run of said tread devices and form rolling supports therefor in a usual manner.

Each drive sprocket 15 is herein shown as being mounted on and driven from a transverse shaft 19. The transverse shaft 19 is rotatably supported at its inner end on a side frame member 20 of the main frame 10 on ball bearings 21, 21 carried in a bearing retainer and support 22 suitably secured to the outside of the frame member 20. A nut 23 is threaded on the inner end of said shaft, to retain the inner races of the ball bearings 21, 21 thereto. The shaft 19 is mounted intermediate its ends on a vertical wall 24 of the tread frame 13 on a ball bearing 25, herein shown as being carried in an annular outwardly extending support 26. A gear 27 is shown as being mounted on the outer end of said shaft, for driving said shaft and the associated continuous tread device 11.

The drive from the motor 12 to the gear 27 includes generally a chain and sprocket drive 29 having drive connection with reverse gearing indicated generally by reference character 30 and like that shown in Patent No. 2,388,385, so not herein shown or described. The reverse gearing 30 is shown as including a gear 31 driven from the chain and sprocket drive 29, and a gear 32 driven from said chain and sprocket drive through an idler (not shown), so as to rotate in a reverse direction from the gear 31. The gears 31 and 32 are freely mounted on a shaft 35. Selectively operable clutch mechanism 33 which may be multiple disk clutches like those shown in the aforementioned Patent No. 2,388,385, may be provided to selectively connect either of the gears 31 or 32 with the shaft 35 to drive said shaft in reverse directions without reversal of the motor 13. The shaft 35 is herein shown as extending within a gear casing 36, mounted on the outer periphery of the support 26, and as being journaled in an inner wall of said casing on a bearing 37. A sprocket 39 is shown as being secured to the end of the shaft 35 and as meshing with an endless chain 40, which may be a roller chain of a well known form. The endless chain 40 is shown as meshing with a sprocket 41 formed integrally with the outer periphery of a drum 43. An end wall 44 of said drum extends inwardly along the outer side of the gear 27, and forms a support for said drum.

The sprocket 41 and drum 43 are shown as having a hub 45 extending inwardly from the end wall 44 and having gear teeth formed integrally with the periphery thereof to form a gear 46 meshing with the teeth of the gear 27 for driving said gear and the shaft 19. The hub 45 is shown as being journaled on a bearing 47 on a pin 49. The pin 49 is mounted at its ends in opposite side walls 51 and 52 of a rockable cage 53, herein shown as being journaled for rocking movement about an axis coaxial with the axis of rotation of the shaft 19. The pin 49 is shown as having a slotted head 54 at one of its ends, recessed within the side wall 51. The opposite end of said pin is threaded to receive a nut 55 to hold said pin and the drum 43 in position on said cage. A spacer collar 56 is shown as being interposed between the inside of the side wall 51 and the end of the hub 45.

The rockable cage 53 is shown as having a pin 57 projecting outwardly from the wall 52 thereof, and journaled in an outer side wall 58 of the gear casing 36 on a bearing 59. The axis of the pin 57 is shown as being coaxial with the axis of rotation of the shaft 19. The inner wall 51 of the cage 53 is shown as being journaled on a flanged bearing 60 mounted on the outside of the bearing support 26, and abutting the inner wall of the gear casing 36.

The cage 53 is thus mounted within the gear casing 36 for rocking or floating movement about the axis of the shaft 19. When a load is applied to the driven sprocket 41, when driving the pinion 27 and shaft 19, the gear 46 will tend to walk about the teeth of the gear 27, and pivotally move the cage 53 about the axis of the shaft 19 in a direction opposite to the direction of rotation of said pinion. If there is nothing to limit shifting movement of the cage 53, this will shift the axis of rotation of the sprocket 41 in a direction to lengthen the distance between the axes of the shafts 35 and 19 (and sprockets 39 and 41) and take up on the slack side of the drive chain 40.

Figure 3:
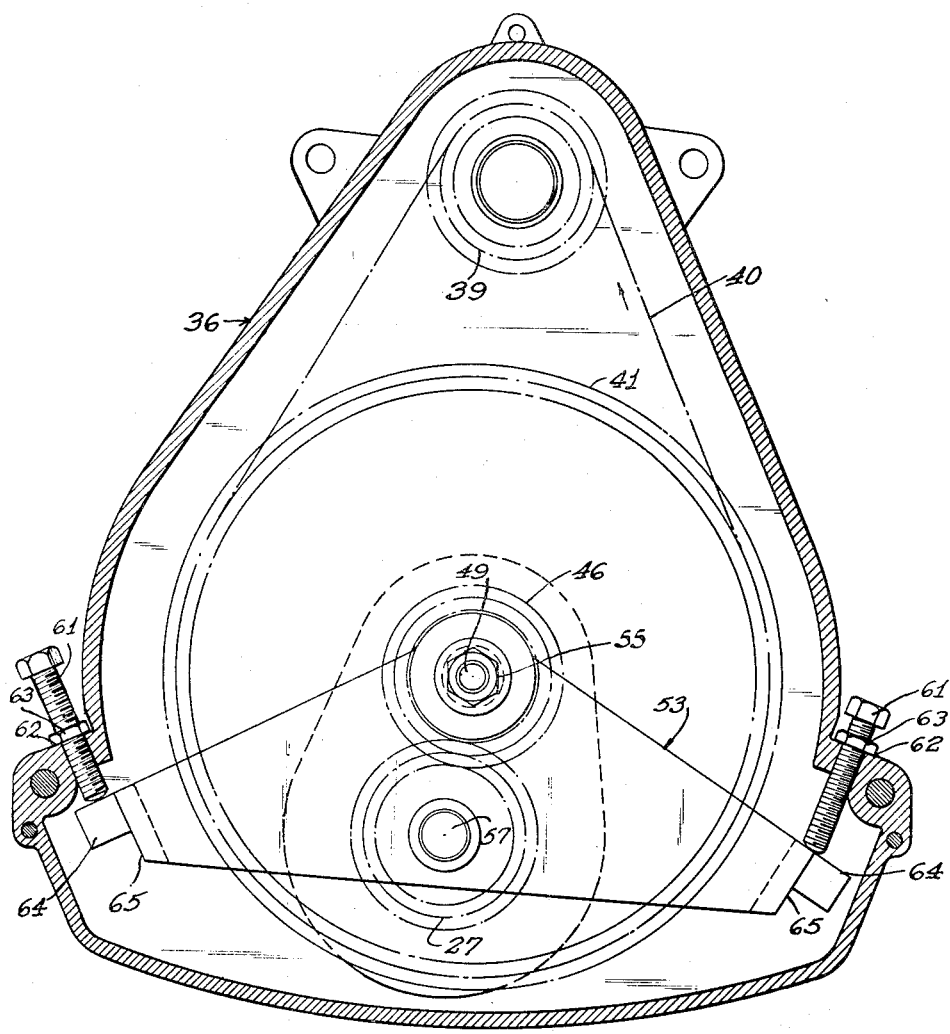
Figure 3 is a sectional view taken substantially along line III—III of Figure 2.

Normally, means is provided to limit shifting movement of the reaction cage 53. Herein this is shown as being two adjusting set screws 61, 61 threaded in and extending through inclined shouldered portions 62, 62 of the gear casing 36 and held in position by lock nuts 63, 63. The machine screws 61, 61 are adapted to engage lugs 64, 64 projecting outwardly from end walls 65, 65 of the cage 53, as shown in Fig. 3, and will maintain the cage 53 in a preferred, angularly adjusted position about the axis of shaft 19. As the chain 40 wears, slack may be progressively taken up by readjusting both screws 61, 61 to lock the cage in a position farther beyond center.

If, for any reason, it is desired to take up or relieve tension on the chain, one set screw 61 may be backed off and the other may be turned to pivot the cage 53 about the shaft 57 until the proper tension is attained. The sprocket 41 may, of course, be placed under load, and the cage 53 may be pivoted by the load on the sprocket until the correct chain tension is attained. The set screws 61, 61 may then be engaged with the lugs 64, 64 to hold the chain under tension. A removable plate or cover 66 may be provided on the wall 58, to enable the operator to determine when the tension is proper.

Breakage of tramming drive chains has frequently been experienced under very severe service conditions where the machine is suddenly reversed, often, under full power, particularly when operating on a grade. This condition may be corrected, and hence the life of the chain increased, by mounting it resiliently as shown in Fig. 5 where one end of the cage 53 is shown with the adjusting screw 61 withdrawn a distance sufficient to prevent over-travel and excessive tightening of the chain, it being understood that the adjusting screw on the other side (not shown) of the cage 53 would be similarly set. By this arrangement the cage 53 is free to rock about the axis of the shaft 19 in an amount limited by the screws. It will rock in one way or the other depending on the direction of the drive. In order to absorb starting and reversal shocks when applied to the chain 40, a compression spring 100, held in place about the end of each screw 61, is seated between a corresponding annular shoulder 99 in the casing and the corresporting lug 64 on the end of the cage. During the above-mentioned process of rocking by the cage 53, the sprocket 41 and its gear 46 will walk about the gear 27 in a direction corresponding to that of the drive.

For light loads, the adjusting screw 61, shown in Fig. 5, may be withdrawn altogether whereupon the slack take-up mechanism will function entirely automatically in following up the slack take-up requirements of the chain as it wears. As the chain wears and lengthens, the cage 53 will simply be rocked in a corresponding degree against the compression of one of the springs 100 to maintain the chain taut and body sides straight.

It may be seen from the foregoing that a simplified drive has been provided for a continuous tread device which is of a compact construction both in vertical and lateral dimensions, and that this compactness is attained by recessing the drive gear for the continuous tread device within the limits of the sprocket 41, so that the sprocket rotates thereabout, and by driving said gear by a gear on the hub of said sprocket, herein shown as being formed integrally therewith. This drive may provide the same reduction as where the sprocket may be directly keyed on the drive shaft for the continuous tread device, and results in a saving in vertical height equal to substantially the distance between the axes of the shafts 19 and 49, making it possible to raise the bottom wall of the gear casing 36 above the ground an equal amount, and providing sufficient clearance from the ground to enable the machine to readily travel over a rough or soft mine bottom without hanging up on the casings for the drive gearing therefor.

It may further be seen that the take-up of my invention may also operate as a manually operable take-up, and that the required tension on the chain may be attained either by placing a load on the chain and holding the cage 53 in the desired position by the set screws 61, 61 or by placing the chain under tension by operation of said set screws, backing one up as the other is engaged with a lug 53, to pivot the cage.

It may still further be seen, in the embodiment of Fig. 5, that a simplified and improved form of take-up for an endless chain power transmitting device has been provided which may automatically take up tension on the chain as a load is applied thereto, by the rocking or floating movement of the drive sprocket 41 about the pivotal axis of the driven load transmitting shaft 19 and that this take-up may automatically take up tension on the slack side of the chain, regardless of the direction of rotation of the drive sprocket.

In summary, it will be seen that the invention is capable of use in three ways as follows: (a) as shown in Fig. 3, where the adjusting screws 61 are set to maintain the cage 53 in a permanently eccentric position, for heavy loads; (b) as shown in Fig. 5, where the cage 53 is automatically rockable against the shock absorbing springs 100, 100, within the limits provided by the partly backed-off adjusting screws 61, for heavy shock loads; and (c) as shown in Fig. 5, except with the adjusting screws 61 completely backed-off to an extent where they would be ineffective to limit the rocking movement of the cage 53, for relatively light loads where it is desired to automatically compensate for chain wear over a long period of time.

It will be understood that modifications and variations may be effected without departing from the spirit and scope of the novel concepts of the present invention.

I claim as my invention.

1. In a face loading machine for loading coal and the like in mines underground, a main frame, tread frames extending along opposite sides of said main frame and projecting laterally therefrom, continuous traction tread devices guided for movement along said tread frames for supporting and propelling said main frame, a drive motor on each side of said main frame, individual drive connections from each motor to an associated continuous traction tread device, each drive connection comprising a driving sprocket and a driven sprocket and a chain meshing therewith, three vertically spaced parallel shafts, a casing detachably secured to the outside of said tread frame and enclosing said shafts and chain and sprockets and affording ready access thereto, the uppermost shaft being a driving shaft and having said driving sprocket secured thereto, the lowermost shaft being a driven shaft, and the intermediate shaft being an idler shaft and having said driven sprocket freely mounted thereon, and said driving and driven shafts being rotatable about fixed axes, a cage rockably mounted within said casing for movement about an axis coincident with the axis of said driven shaft and having said intermediate shaft mounted thereon, a geared drive connection between said driven sprocket and said driven shaft including a gear on said idler shaft within the limits of said driven sprocket and driven by said driven sprocket and a gear secured to said driven shaft and meshing with and driven by said first mentioned gear and spacing the axis of rotation of said driven sprocket above the axis of rotation of said driven shaft and thereby increasing the clearance between said gear casing and the ground, said three shafts lying in a common vertical plane under no load conditions and said cage controlling rocking movement of said idler shaft to one side or the other of said common vertical plane depending upon the direction of rotation of said driving shaft, and means carried by said casing and accessible from the outside thereof and engageable with said cage within said casing for limiting rocking movement of said cage and idler shaft, as selected.

2. In a face loading machine for loading coal and the like in mines underground, a main frame, tread frames extending along opposite sides of said main frame and projecting laterally therefrom, continuous traction tread devices guided for movement along said tread frames for supporting and propelling said main frame, a drive motor on each side of said main frame, individual drive connections from each motor to an associated continuous traction tread device, each drive connection comprising a driving sprocket and a driven sprocket and a chain meshing therewith, three vertically spaced parallel shafts, a casing detachably secured to the outside of said tread frame and enclosing said shafts and chain and sprockets and affording ready access thereto, the uppermost shaft being a driving shaft and having said driving sprocket secured thereto, the lowermost shaft being a driven shaft, and the intermediate shaft being an idler shaft and having said driven sprocket freely mounted thereon, and said driving and driven shafts being rotatable about fixed axes, a cage rockably mounted within said casing for movement about an axis coincident with the axis of said driven shaft and having said intermediate shaft mounted thereon, a geared drive connection between said driven sprocket and said driven shaft including a gear on said idler shaft within the limits of said driven sprocket and driven by said driven sprocket, and a gear secured to said driven shaft and meshing with and driven by said first mentioned gear and spacing the axis of rotation of said driven sprocket above the axis of rotation of said driven shaft and thereby increasing the clearance between said gear casing and the ground, said three shafts lying in a common vertical plane under no load conditions and said cage controlling rocking movement of said idler shaft and having opposite end portions projecting from said cage outwardly from opposite sides of said chain, and manually operable abutment means carried by said gear casing and accessible from the outside thereof and extending within said gear casing for engagement with opposite end portions of said cage for limiting rocking movement of said cage and pivoting said cage to vary the slack on said chain, and holding said cage in position to maintain a desired tension on said chain.

3. In a face loading machine for loading coal and the like in mines underground, a main frame, tread frames extending along opposite sides of said main frame and projecting laterally therefrom, continuous traction tread devices guided for movement along said tread frames for supporting and propelling said main frame, a drive motor on each side of said main frame, individual drive connections from each motor to an associated continuous traction tread device, each drive connection comprising a driving sprocket and a driven sprocket and a chain meshing therewith, three vertically spaced parallel shafts, a casing detachably secured to the outside of said tread frame and enclosing said shafts and chain and sprockets and affording ready access thereto, the uppermost shaft being a driving shaft and having said driving sprocket secured thereto, the lowermost shaft being a driven shaft, and the intermediate shaft being an idler shaft and having said driven sprocket mounted thereon, and said driving and driven shafts being rotatable about fixed axes, a cage rockably mounted within said casing for movement about an axis coincident with the axis of said driven shaft and having said intermediate shaft mounted thereon, a geared drive connection between said driven sprocket and said driven shaft including a gear on said idler shaft within the limits of said driven sprocket and driven by said driven sprocket, and a gear secured to said driven shaft and meshing with and driven by said first mentioned gear and spacing the axis of rotation of said driven sprocket above the axis of rotation of said driven shaft and thereby increasing the clearance between said gear casing and the ground, said three shafts lying in a common vertical plane under no load conditions and said cage controlling rocking movement of said idler shaft to one side or the other of said common vertical plane depending upon the load and the direction of rotation of said driving shaft, said cage having an end extremity extending beyond said chain and driven sprocket, and a spring interposed between said end extremity and said casing and biasing said cage in a direction to bias the longitudinal axis of said idler shaft to intercept a common vertical plane extending through the axes of said driving and said driven shafts.

References Cited in the file of this patent

UNITED STATES PATENTS

| | | |
|---|---|---|
| 642,863 | Creveling | Feb. 6, 1900 |
| 854,671 | Seymour | May 21, 1907 |
| 1,744,516 | Whitacre | Jan. 21, 1930 |
| 1,863,504 | Schmid | June 14, 1932 |
| 2,108,536 | Joy | Feb. 15, 1938 |
| 2,144,028 | Pilkington | Jan. 17, 1939 |
| 2,372,342 | Smith et al. | Mar. 27, 1945 |
| 2,479,617 | Hawley et al. | Aug. 23, 1949 |

FOREIGN PATENTS

| | | |
|---|---|---|
| 5,500 | Great Britain | Jan. 11, 1906 |
| 182,765 | Great Britain | Feb. 16, 1922 |